US 6,683,827 B1

(12) United States Patent
Omoto et al.

(10) Patent No.: US 6,683,827 B1
(45) Date of Patent: Jan. 27, 2004

(54) DISK STORAGE APPARATUS AND DISK CHANGER APPARATUS WITH ENHANCED ACCESS TO DISKS

(75) Inventors: Hideo Omoto, Hamamatsu (JP); Takehiro Mabuchi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 313 days.

(21) Appl. No.: 09/713,481

(22) Filed: Nov. 15, 2000

(30) Foreign Application Priority Data

Nov. 19, 1999 (JP) .......................................... 11-330474

(51) Int. Cl.[7] .............................................. G11B 17/00
(52) U.S. Cl. .................................. 369/30.78; 206/308.1
(58) Field of Search ........................... 369/30.77, 30.78, 369/30.61, 38.01, 30.52; 206/308.1, 309, 472, 311, 313; 211/40, 41; 312/9.42, 9.9

(56) References Cited

U.S. PATENT DOCUMENTS

| 4,723,662 A | * | 2/1988 | Johnson ........................ 211/40 |
| 5,027,955 A | * | 7/1991 | Shoemaker et al. ...... 206/307.1 |
| 5,170,893 A | * | 12/1992 | Smith ........................... 211/40 |
| 5,188,228 A | * | 2/1993 | Barrett ...................... 206/308.1 |
| 5,246,107 A | * | 9/1993 | Long et al. ............... 206/308.1 |
| 5,301,819 A | * | 4/1994 | Moeken ........................ 211/40 |
| 5,322,162 A | * | 6/1994 | Melk ........................... 206/310 |
| 5,550,801 A | * | 8/1996 | Enomoto et al. ............ 369/191 |
| 5,615,202 A | * | 3/1997 | Enomoto et al. ......... 369/30.89 |
| 5,690,221 A | * | 11/1997 | Yeh ........................... 206/308.1 |
| 5,697,684 A | * | 12/1997 | Gyovai ........................ 211/168 |
| 5,727,695 A | * | 3/1998 | English, II ................ 206/308.1 |
| 5,729,524 A | * | 3/1998 | Pines et al. .................. 369/192 |
| 5,779,037 A | * | 7/1998 | D'Agaro et al. .......... 206/308.1 |
| 5,785,399 A | * | 7/1998 | Frankeny et al. ............ 312/324 |
| 5,798,998 A | * | 8/1998 | Fukushima et al. ......... 369/30.9 |
| 5,870,359 A | * | 2/1999 | Furusawa et al. ......... 369/30.77 |
| 6,039,190 A | * | 3/2000 | Clausen ........................ 211/40 |
| 6,050,425 A | * | 4/2000 | Kappel et al. ................. 211/40 |
| 6,116,432 A | * | 9/2000 | Rohner ........................ 211/40 |
| 6,360,890 B1 | * | 3/2002 | Proffit ....................... 206/308.1 |
| 6,561,346 B1 | * | 5/2003 | Lew et al. ................. 206/308.1 |

* cited by examiner

Primary Examiner—Brian E. Miller
(74) Attorney, Agent, or Firm—Morrison & Foerster LLP (57) ABSTRACT

As a front panel of a disk changer apparatus is moved to an open position, a disk rack moving in response to the movement of the front panel operates to hold a plurality of disks in a staggered configuration. Such a staggered configuration of the disks allows a user to easily pick up and take out any desired disk from the disk rack.

11 Claims, 8 Drawing Sheets

DISK STORAGE APPARATUS AND DISK CHANGER APPARATUS WITH ENHANCED ACCESS TO DISKS

BACKGROUND OF THE INVENTION

The present invention relates to an improved disk storage apparatus for CDs (Compact Disks) or DVDs (Digital Versatile Disks) and a disk changer apparatus using such a disk storage apparatus.

Figure 1:
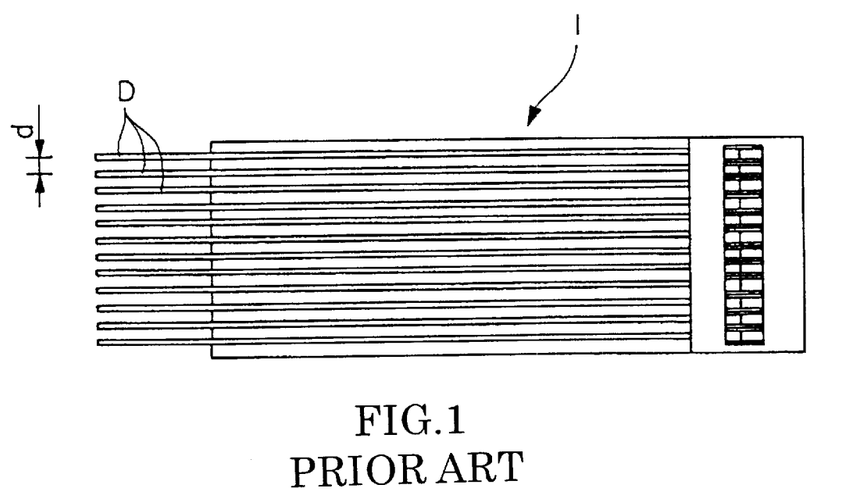
FIG. 1 is a view showing an example of a conventional disk rack where a plurality of disks are stored in a stacked array.

Disk changer apparatus for CDs or DVDs include a disk storage apparatus in the form of a disk rack with a plurality of storage slots or cells for storing a plurality of disks in one or more stacked arrays, and any designated one of the stored disks is taken out from the disk rack for reproduction of recorded information on the disk or other purpose. FIG. 1 is a side view schematically showing an example of a conventional disk rack 1 of a type where a plurality of disks D are stored in the storage cells in a stacked array.

As in many other disk racks for disk changer apparatus, the storage cells in the disk rack 1 shown in FIG. 1 are provided at short intervals in order to store as many disks D as possible, and thus the disks D stored in the respective storage cells are spaced from each other by a considerably small distance d. Even with such a small distance d between the disks D, no significant problem would arise when a designated disk D is taken out from the disk rack 1 via an automatic hand member of the disk changer apparatus. However, when a designated disk D is taken out from the disk rack 1 manually by a user, the small distance d between the stored disks D would make it difficult for the user to pick up the designated disk D with fingers. If the disk rack 1 is constructed to provide a greater distance d between the stored disks D with a view to allowing the user to easily pick up the designated disk D with fingers, then the number of the disks D storable in the disk rack 1, i.e. storage capacity of the disk rack 1, would have to be reduced.

Figure 2:
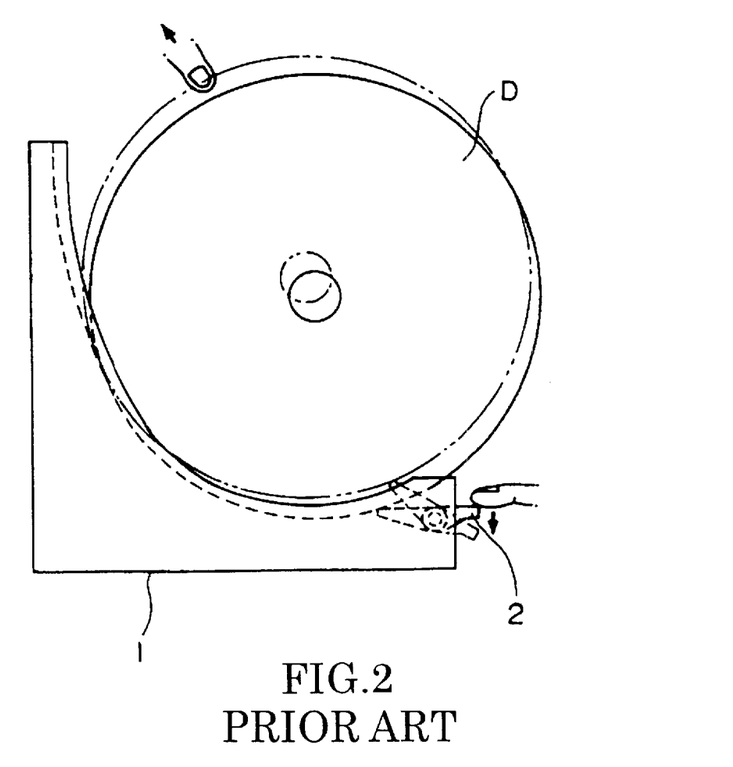
FIG. 2 is a view showing another example of a conventional disk rack.

To avoid the aforesaid problems, an improved disk rack 1 has been proposed which has a disk pusher lever 2 as illustrated in FIG. 2. In this case, a separate disk pusher lever 2 is provided for each of the storage cells in the disk rack 1. By the user only operating the disk pusher lever 2 associated with a desired disk D, the desired disk D can be mechanically pushed forward (i.e., from a position denoted by solid line to a position denoted by dot-and-dash line), so that the user can easily pick up and draw the disk D out of the storage cell.

However, the provision of the movable disk pusher lever 2 for each of the storage cells as mentioned above significantly increases the number of component parts, which would thus lead to a complicated structure of the disk rack.

SUMMARY OF THE INVENTION

In view of the foregoing, it is an object of the present invention to provide an improved disk storage apparatus which allows a user to easily take out a desired disk therefrom only with a simplified structure and without having to reduce the number of disks storable therein, and a disk changer apparatus using such an improved disk storage apparatus.

In order to accomplish the above-mentioned object, the present invention provides an improved disk storage apparatus which comprises a disk holding mechanism, preferably in the form of a disk rack, including a plurality of storage cells arranged to store a plurality of disks in a stacked array, the disk holding mechanism being movable between a disk loading/unloading position to allow a user to load or unload a desired disk to or from one of the storage cells and a disk storing position, When the disk holding mechanism is in the disk storing position, the disk holding mechanism holds the disks in substantial alignment as viewed in a direction of the stacked array, while when the disk holding mechanism is in the disk loading/unloading position, the disk holding mechanism holds the disks in a staggered configuration as viewed in the direction of the stacked array.

Each of the storage cells has a disk-supporting surface of either of first and second shapes, and the storage cell having the disk-supporting surface of the first shape and the storage cell having the disk-supporting surface of the second shape alternate in the direction of the stacked array in such a manner that the disks can be held in the staggered configuration by the respective disk-supporting surfaces of the storage cells.

According to another aspect of the present invention, there is provided a disk changer apparatus which comprises: the above-mentioned disk storage; a hand member arranged to take out a designated one of the disks from the disk storage apparatus and place the taken-out designated disk at a predetermined position; and an optical pickup unit arranged to perform either or both of reproduction and recording processes on the designated disk having been placed at the predetermined position by the hand member.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE PREFERRED EMBODIMENTS

Figure 3:
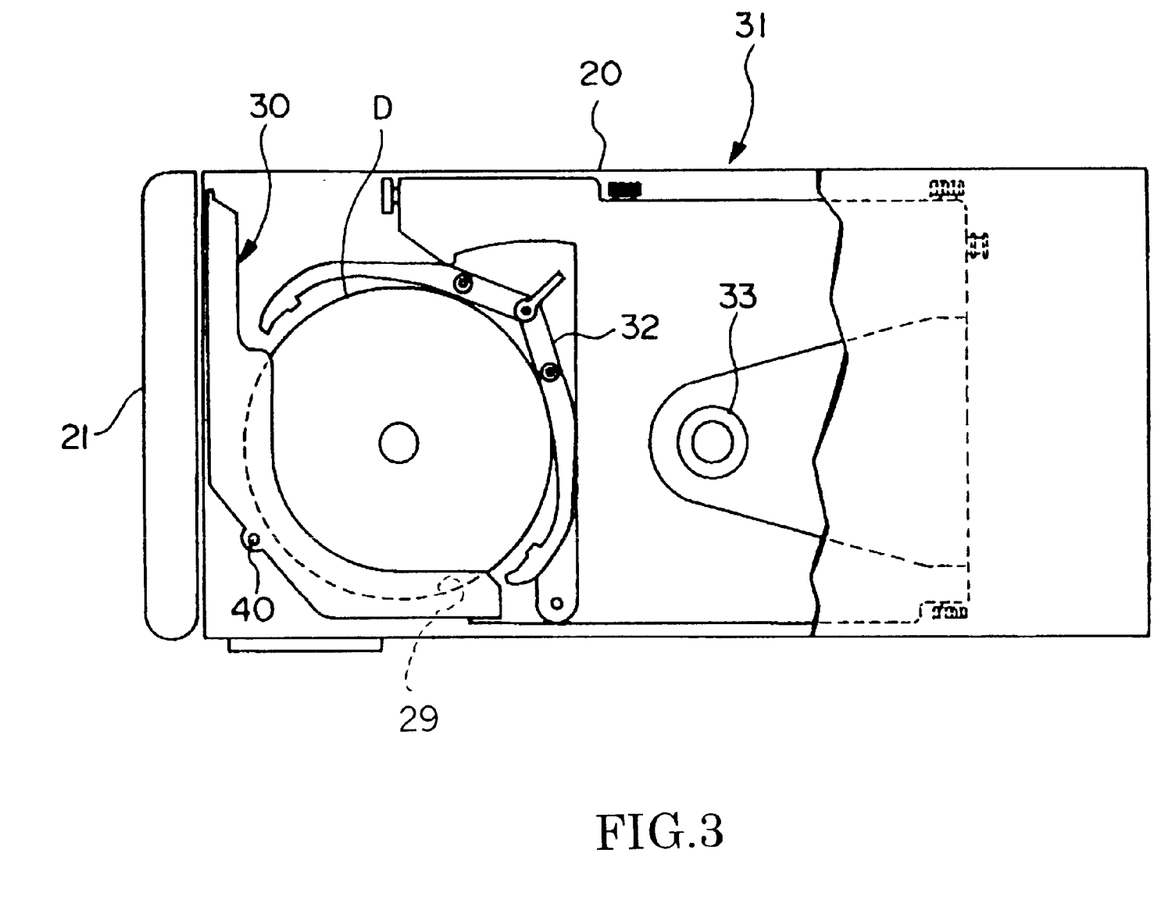
FIG. 3 is a sectional side view of a disk changer apparatus including a disk rack in accordance with an embodiment of the present invention.

FIG. 3 is a sectional side view of a disk changer apparatus including a disk rack 30 in accordance with a preferred embodiment of the present invention. As shown, the disk changer apparatus includes the disk rack 30 as a disk storage apparatus having a plurality of storage slots or cells 29 for storing a plurality of disks D (only one disk and storage cell 29 are shown in FIG. 3), and an optical pickup unit 31 that takes out a designated disk D from one of the storage cells 29 and performs recording or reproduction to or from the taken-out disk D.

More specifically, the optical pickup unit 31 includes an automatic hand member 32 taking out any one of the disks D that are stored in the disk rack 30 in a stacked array extending in a direction normal to the sheet of the figure. The hand member 32 picks up and takes out a designated disk D from the disk rack 30 to a predetermined location on the right of the figure. Optical pickup 33 performs a recording or reproduction process on the disk D at the predetermined location by irradiating a laser light beam onto the disk D. Construction of the optical pickup 33 is conventional and thus will not be described here.

Figure 4:
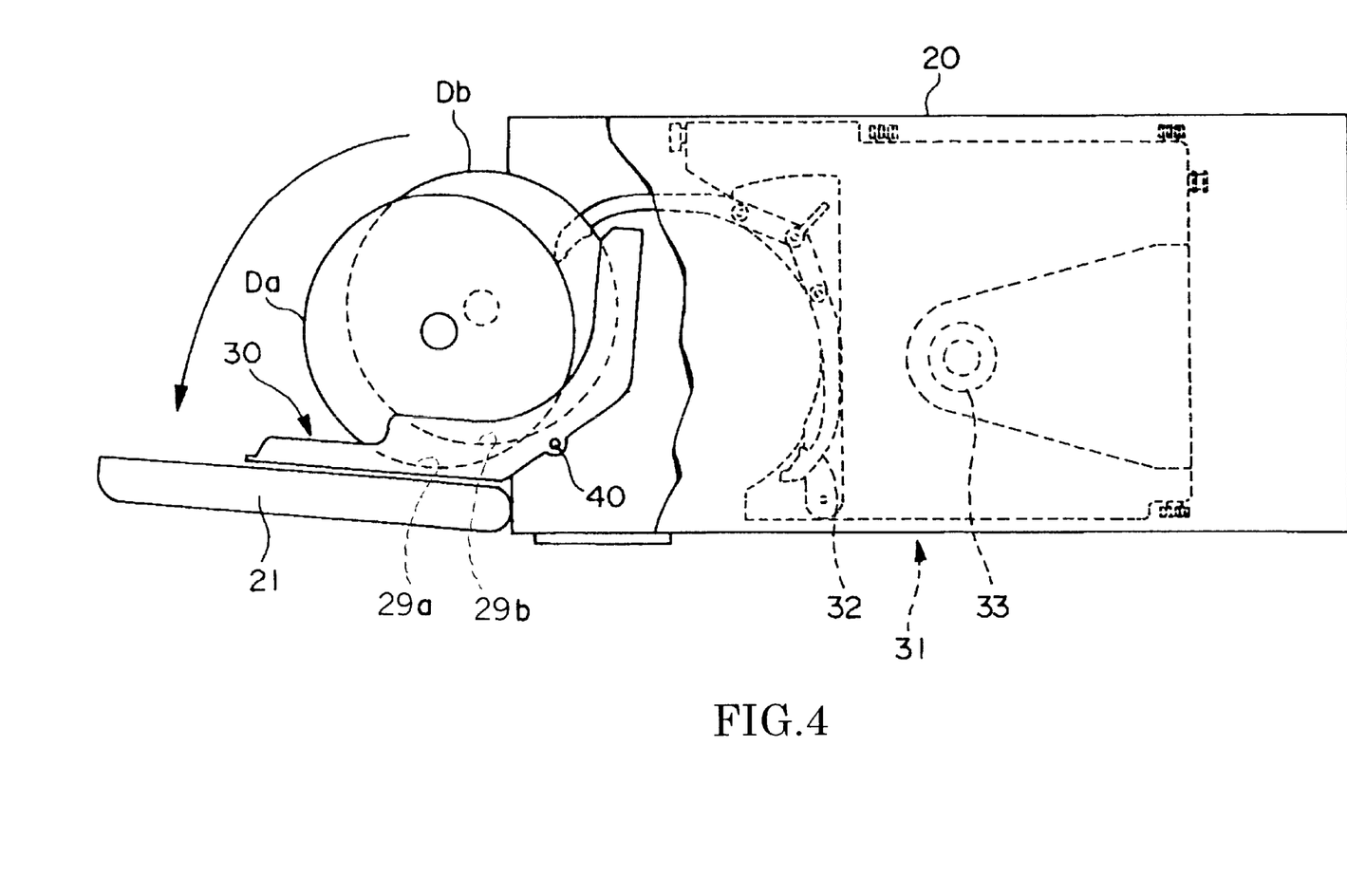
FIG. 4 is a side view showing the disk changer apparatus when a front panel is in an open position.
Figure 5:
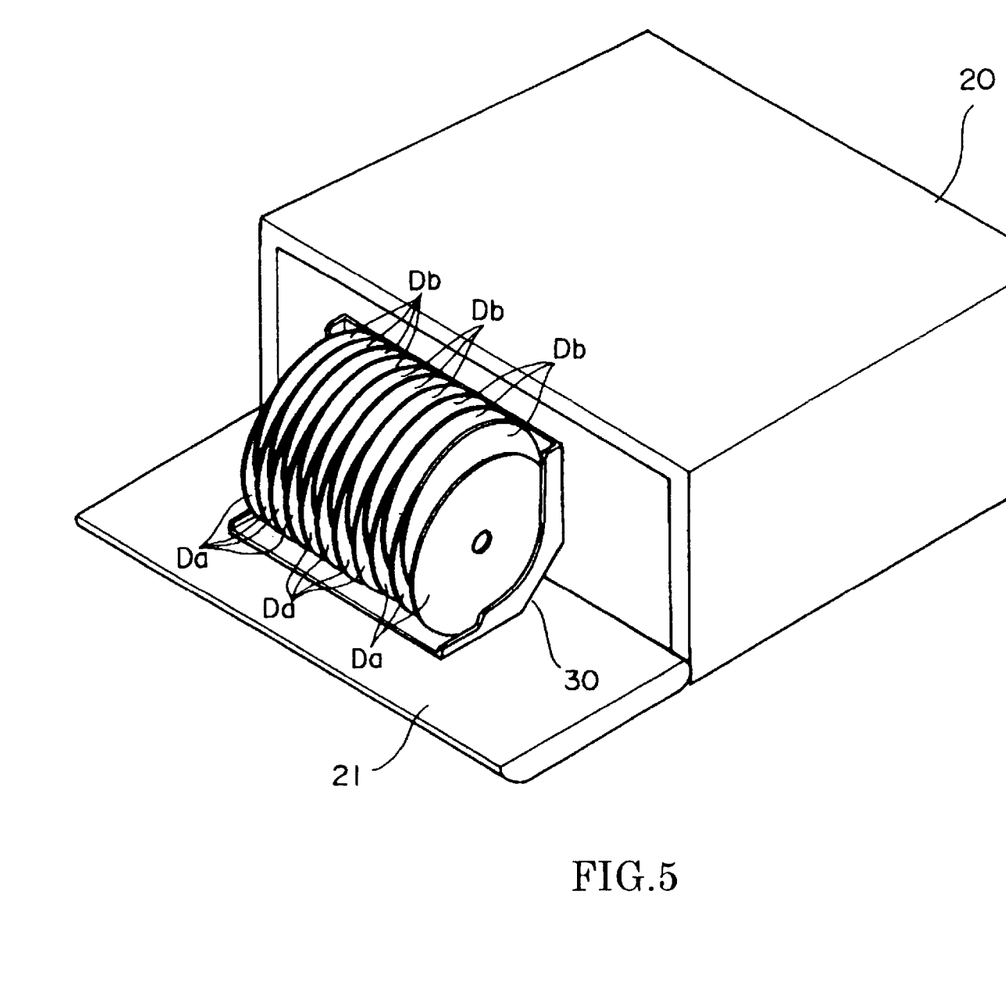
FIG. 5 is a perspective view showing the disk changer apparatus when the front panel is in the open position.

The disk rack 30 has a dogleg shape as viewed in the direction of the stacked array (i.e., in the direction normal to the sheet of the figure), and the disk rack 30 is pivotably supported by an axis 40 near its dogleg bent point. Here, the disk rack 30, as a disk holding mechanism, is movable together with an openable/closable front panel 21 provided on the front (left in the figure) end of a housing 20 of the disk changer apparatus. Namely, in response to the movement of the front panel 21, the disk rack is movable between a disk loading/unloading position to allow a user to load or unload a desired disk D to or from one of the storage cells and a disk storing position. More specifically, as the front panel 21 is opened as shown in FIGS. 4 and 5, the disk rack 30 pivots about the axis 40 in a counterclockwise direction of FIG. 4, so that all the disks D stored in the respective storage cells 29 of the disk rack 30 are exposed from within the housing 20 to a user. Note that FIG. 3 shows the front panel 21 in its closed position, by which the disk rack 30 is accommodated within the housing 20 as shown. When the recording or reproduction process is performed on a designated one of the stored disks D, the designated disk D is taken out from the disk rack 30 by means of the automatic hand member 32. It should be appreciated that the front panel 21 and disk rack 30 may be constructed to move independently of each other, rather than moving together as described above. In another alternative, an arrangement may be made to select whether the front panel 21 and disk rack 30 should move together or independently of each other.

Figure 6:
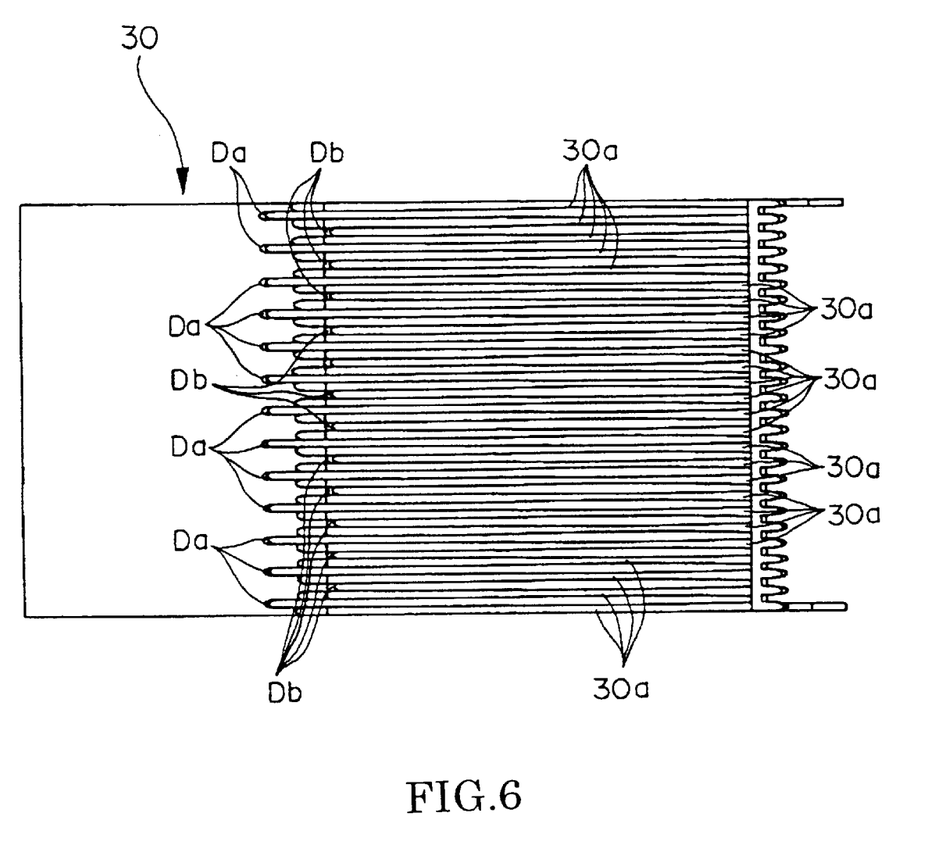
FIG. 6 is a top plan view of the disk rack in accordance with the embodiment of the invention.

FIG. 6 is a top plan view of the disk rack 30 when the front panel 21 is in its open position. When the front panel 21 is in the open position, the disks D stored in the disk rack 30 are held in a staggered configuration as viewed in the direction of the stacked array direction (hereinafter "stacked array direction"); that is, every other disk D is projected forward or toward the user (leftward in the figure), as illustrated in FIGS. 4 to 6. Each of the disks projected forward (projected disk) is represented by reference character Da while each of the disks other than the projected disks (non-projected disk) is represented by reference character Db. When the front panel 21 is in the closed position as shown in FIG. 3, all the disks D stored in the disk rack 30 are held in exact alignment in the stacked array direction. The staggered configuration or arrangement of the stored disks D is achieved by two different shapes of disk-supporting surfaces of the storage cells 19 in the disk rack 30 that contact the outer edges of the corresponding disks D to thereby position the disks D in the predetermined configuration. More specifically, in the disk rack 30, every other storage cell 29 has a disk-supporting surface of a first shape while each of the other storage cells 29 has a disk-supporting surface of a second shape. That is, in the instant embodiment, the storage cells 29 having the disk-supporting surfaces of the first and second shapes alternate in the stacked array direction as will be later described in detail, so that the disks Da and Db are displaced from each other in the front-rear direction of the disk rack 30 when the front panel 21 is in the open position. The following paragraphs describe in greater detail the construction of the disk rack 30.

Figure 7:
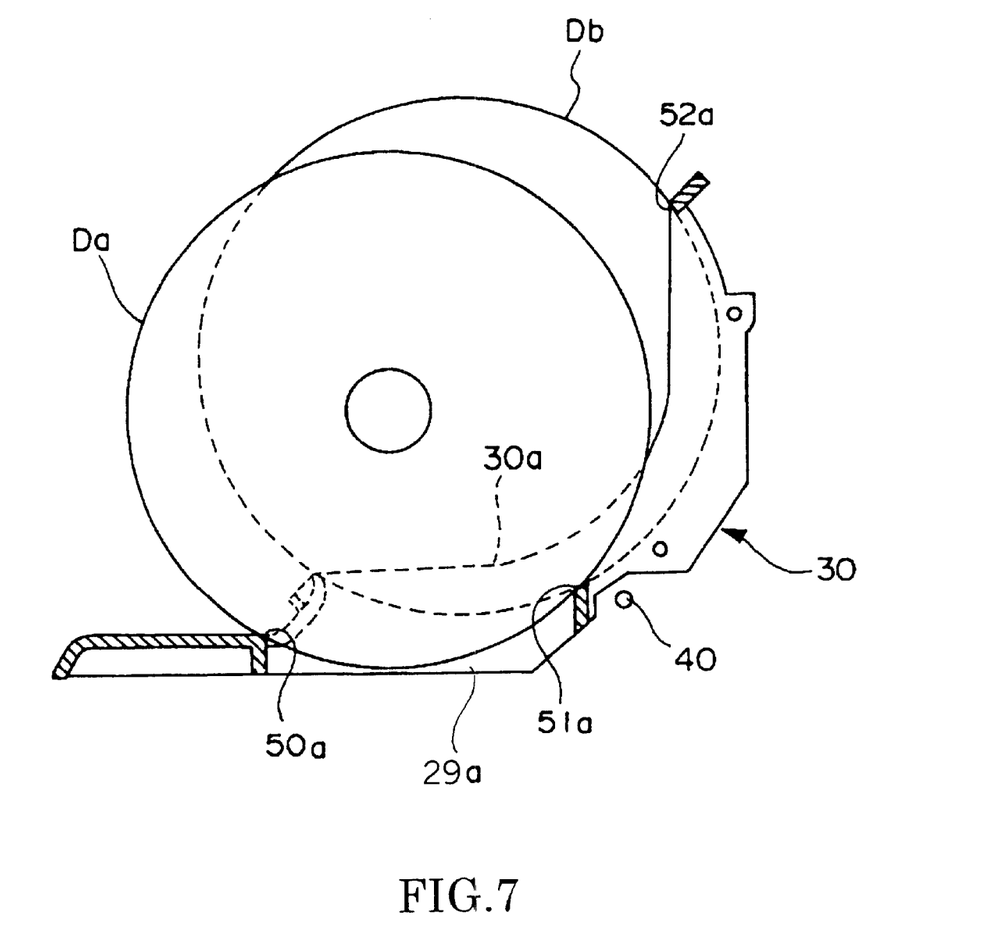
FIG. 7 is a sectional view showing one of the storage cells having a disk-supporting surface of a first shape.

As best shown in a top plan view of FIG. 6, the storage cells 29 of the disk rack 30 comprise planar partition walls 30a intervening between the disks D with each of the disks D held widthwise between a pair of opposed partition walls 30a constituting one of the storage cells 29. Thus, the partition walls 30a hold the disks D in respective stacked positions, i.e. respective vertical positions of FIG. 6. Specifically, the storage cells 29a having the first-shape disk-supporting surface (hereinafter "first-type storage cells" 29a) and the storage cells 29b having the second-shape disk-supporting surface (hereinafter "second-type storage cells" 29b) differ from each other in the shape and arrangement of disk rest portions that are provided on the disk-supporting surface for contacting the outer edge of the corresponding disk D to thereby rest the disk D at the predetermined position along the direction of the general plane of the disk D. More specifically, FIG. 7 is a sectional view of the first-type storage cell 29a, which is taken along the planar surface of the disk Da of FIG. 6. As shown in FIG. 7, when the front panel 21 is in the open position, the disk Da stored in the first-type storage cell 29a abuts against two rest portions 50a and 51a by its own weight so that it is fixedly supported at the predetermined projected position by the two lower portions 50a and 51a. The first-type storage cell 29a also has a rear rest portion 52a that does not contact the disk Da when the front panel 21 is in the open position as shown in FIG. 7.

Figure 8:
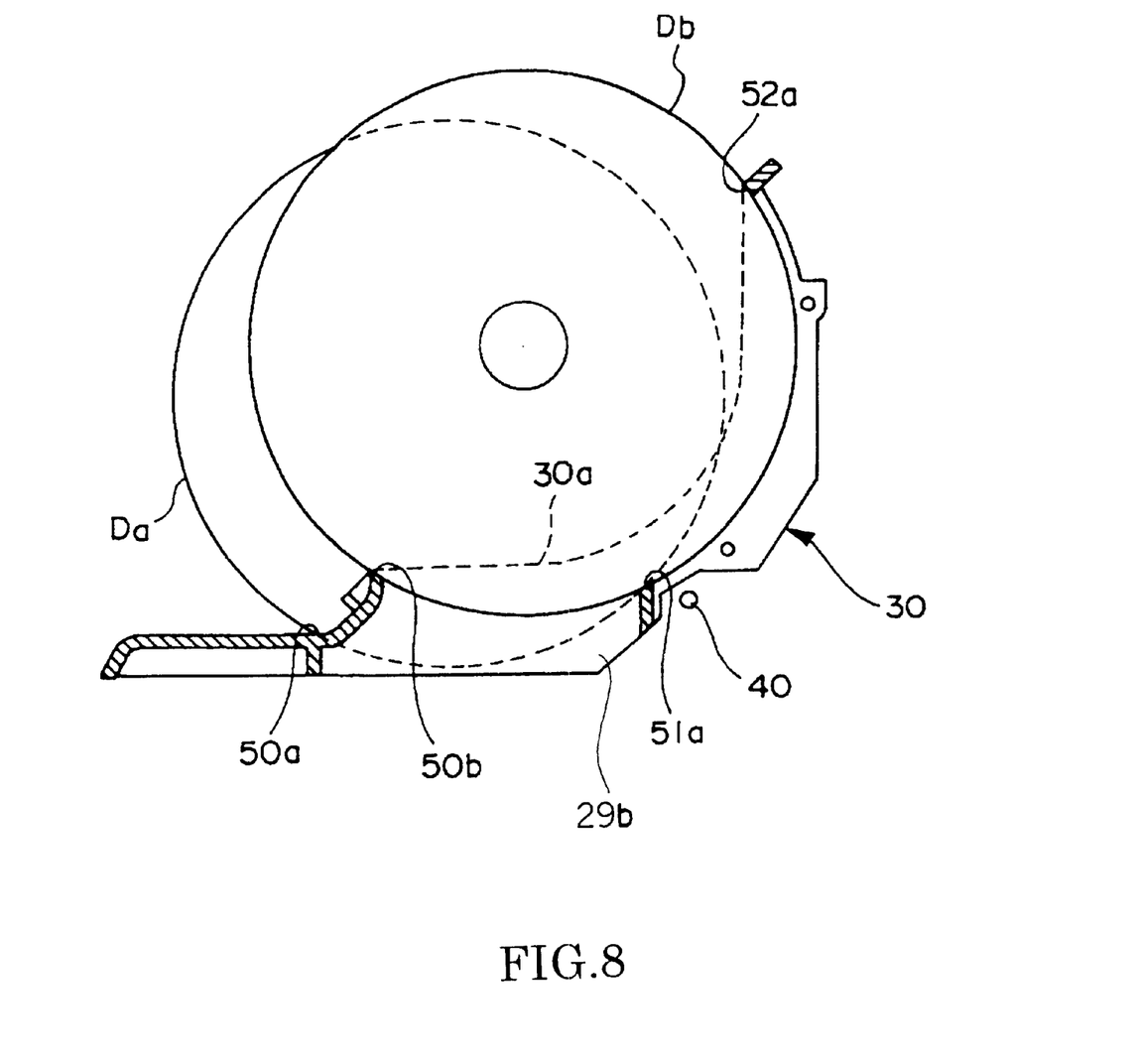
FIG. 8 is a sectional view showing another of the storage cells having a disk-supporting surface of a second shape.

Further, FIG. 8 is a sectional view of the second-type storage cell 29b, which is taken along the planar surface of the disk Db of FIG. 6. As shown, the disk Db stored in the storage cell 29b abuts against three rest portions 51a, 50b and 52a. The rest portion 51a has the same shape as the rest portion 51a of the above-described first-type storage cell 29a, the rest portion 50b projects higher than the rest portion 50a of the first-type storage cell 29a, and the rear rest portion 52a has the same shape as the rest portion 52a of the first-type storage cell 29a. The disk Db stored in the second-type storage cell 29b abuts against the rest portions 50a and 51a by its own weight so that it is fixedly supported at the predetermined position primarily by the two lower rest portions 50a and 51a. In this case, the rear rest portion 52a contacts the disk Db as an additional positioning element.

With the rest portion 50a of the first-type storage cell 29a having a smaller height than the rest portion 50b of the second-type storage cell 29b, each disk Da stored in the first-type storage cell 29a can be held forward of each disk Db stored in the second-type storage cell 29b while the front panel 21 is open.

Figure 9:
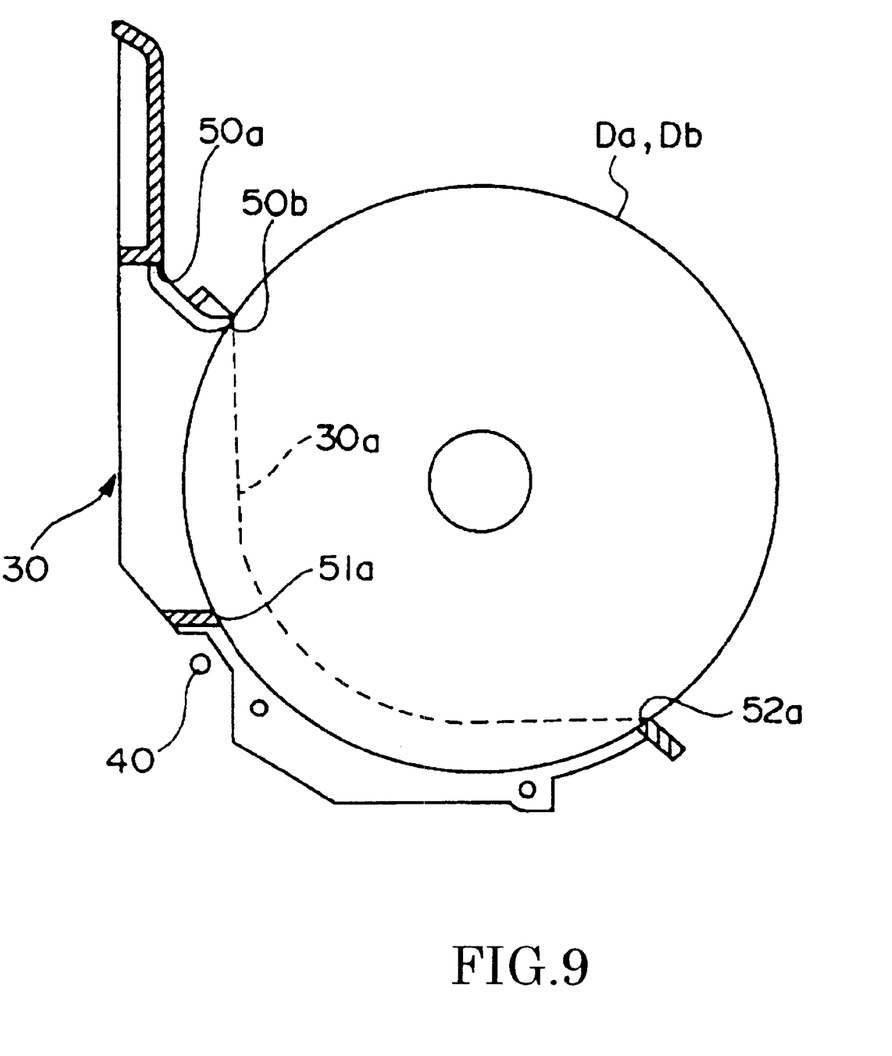
FIG. 9 is a sectional view showing the disk changer apparatus when the front panel is in a closed position and thus the disk rack is accommodated within a housing of the disk changer apparatus.

FIG. 9 is a sectional view showing the disk changer apparatus when the front panel 21 is in the closed position and thus the disk rack 30 is completely accommodated within the housing of the disk changer apparatus. As shown, when the front panel 21 is in the closed position, all the disks Da and Db abut against the rest portions 51a and 52a by their own weight without contacting the rest portion 50a, so that they are all fixedly supported by the two rest portions 51a and 52a, irrespective of whether the storage cells receiving the disks are of the first type or second type. Thus, when the front panel 21 is in the closed position, all the disks Da and Db are held by the rest portions 51a and 52a in substantial alignment in the stacked array direction.

As has been described above, the disk rack 30 according to the embodiment of the present invention is constructed in such a manner that as the front panel 21 is opened, the disks D stored in the disk rack 30 are brought into the staggered configuration by virtue of the different heights of the rest portions 50a and 50b of the first-type and second-type storage cells 29a and 29b. Thus, if the distance d between the disks D stored in the adjoining first-type and second-type storage cells 29a and 29b is represented by "d", every adjoining projected disks Da are spaced from each other by two times the normal distance d (i.e., 2d), and similarly every adjoining non-projected disks Db are spaced from each other by two times the normal distance d (i.e., 2d). By the staggered configuration of the disks D stored in the disk rack 30 and hence the increased distance 2d between the adjoining projected disks Da and between the adjoining non-projected disks Db, the user is allowed to pick up and take out any desired one of the stored disks with utmost ease. In this case, it is not necessary to construct the disk rack 30 in such a way as to increase the distance d between the disks D (i.e. Da and Db), and thus the disk rack 30 can maintain the same storage capacity (i.e., can store the same number of the disks D) as the conventional counterpart without an increase in its size.

Further, because the disks D are held in the disk rack 30 in alignment in the stacked array direction while the front panel 21 is closed, i.e. while the disk changer apparatus is operable condition, it is only necessary that the hand member 32 of the optical pickup unit 31 have the same function as in the conventional disk changer apparatus in order to take a designated disk D from the disk rack 30, so that complication of the construction can be avoided.

Furthermore, because the staggered configuration of the disks D stored in the disk rack 30 can be provided by just forming the disk-supporting surfaces of the storage cells 29a and 29b into different shapes, the present invention allows the user to readily take out a desired disk from the disk rack 30 without increasing the number of the component parts and hence the cost of the disk rack 30.

Whereas the preferred embodiment has been described above in relation to the disk rack 30 with the first-type and second-type storage cells 29a and 29b shaped as shown in FIGS. 7 and 8, the disk rack 30 may be formed into any other shape, as long as the disk rack 30 can hold the disks D in the staggered configuration when the front panel 21 is in the open position and can store the disks D in alignment in the stacked array direction.

In summary, the present invention arranged in the above-described manner allows the user to easily pick up and take out a desired disk from the disk rack, without requiring a complicated structure and without having to reduce the storage capacity of the disk rack.

What is claimed is:

1. A disk storage apparatus comprising
   a disk holding mechanism including a plurality of storage cells arranged to store a plurality of disks in a stacked array, said disk holding mechanism being movable between a disk loading/unloading position to allow a user to load or unload a desired disk to or from one of said storage cells and a disk storing position,
   wherein when said disk holding mechanism is in the disk storing position, said disk holding mechanism holds the disks in substantial alignment as viewed in a direction of the stacked array, while when said disk holding mechanism is in the disk loading/unloading position, said disk holding mechanism holds the disks in a staggered configuration as viewed in the direction of the stacked array.

2. A disk storage apparatus as claimed in claim 1 wherein each of said storage cells has a disk-supporting surface of either of first and second shapes, and wherein said storage cell having the disk-supporting surface of the first shape and said storage cell having the disk-supporting surface of the second shape alternate in the direction of the stacked array in such a manner that the disks are held in the staggered configuration by respective disk-supporting surfaces of said plurality of storage cells.

3. A disk changer apparatus comprising:
   a disk storage apparatus including a disk holding mechanism including a plurality of storage cells arranged to store a plurality of disks in a stacked array, said disk holding mechanism being movable between a disk loading/unloading position to allow a user to load or unload a desired disk to or from one of said storage cells and a disk storing position, wherein when said disk holding mechanism is in the disk storing position, said disk holding mechanism holds the disks in substantial alignment as viewed in a direction of the stacked array, while when said disk holding mechanism is in the disk loading/unloading position, said disk holding mechanism holds the disks in a staggered configuration as viewed in the direction of the stacked array;
   a hand member arranged to take out a designated one of the disks from said disk storage apparatus and place the taken-out designated disk at a predetermined position; and
   an optical pickup unit arranged to perform either or both of reproduction and recording processes on the designated disk having been placed at the predetermined position by said hand member.

4. A disk rack for receiving at least first and second disk shaped articles, comprising:
   a first cell for receiving a first disk shaped article at a first position corresponding to a disk unloading position and a second position corresponding to a disk loading position and movable therebetween in a first plane; and
   a second cell for receiving a second disk shaped article at said first and second positions and movable therebetween in a second plane parallel to the first plane;
   wherein in the first position the first and second disk shaped articles in the first and second respective cells are axially offset and in the second position the first and second disk shaped articles are coaxial.

5. The disk rack according to claim 4, wherein the first cell includes first, second and third portions and the second cell includes second, third and fourth portions, respectively, to receive the first and second disk shaped articles at the first and second positions.

6. The disk rack according to claim 5, wherein the first cell receives the first disk shaped article by the first and second portions at the first position and the second cell receives the second disk shaped article by the second and fourth portions at the first position.

7. The disk rack according to claim 6, wherein the first and fourth portions are different heights and the first and second disk shaped articles contact the first and fourth portions, respectively, at the first position for receiving the first and second disk shaped articles.

8. The disk rack according to claim 5, wherein the first cell receives the first disk shaped article by the second and third portions at the second position and the second cell receives the second disk shaped article by the second and third portions at the second position to align the first and second disk shaped articles in a stacked position.

9. The disk rack according to claim 4, wherein the first and second cells pivot about an axis.

10. The disk rack according to claim 4, wherein the first and second cells have a generally dog-leg shape.

11. The disk rack according to claim 4 further comprising a plurality of cells for receiving a plurality of disk shaped articles at said first and second positions wherein, in the first position, alternating articles of the plurality of disk shaped articles are coaxial.

* * * * *